(12) United States Patent
Stanley (10) Patent No.: US 10,890,095 B2
(45) Date of Patent: Jan. 12, 2021

(54) AFTER MARKET EXHAUST ADAPTER FOR DRYING COURTS

(71) Applicant: Ira Stanley, Miami, FL (US)

(72) Inventor: Ira Stanley, Miami, FL (US)

(*) Notice: Subject to any disclaimer, the term of this patent is extended or adjusted under 35 U.S.C. 154(b) by 160 days.

(21) Appl. No.: 16/265,025

(22) Filed: Feb. 1, 2019

(65) Prior Publication Data

US 2020/0248609 A1 Aug. 6, 2020

(51) Int. Cl.
*F01N 13/08* (2010.01)
*F01N 13/18* (2010.01)
*A01G 20/47* (2018.01)

(52) U.S. Cl.
CPC ........... *F01N 13/082* (2013.01); *A01G 20/47* (2018.02); *F01N 13/1805* (2013.01)

(58) Field of Classification Search
CPC .... F01N 13/082; F01N 13/1805; A01G 20/47
USPC ........................................................ D12/194
See application file for complete search history.

(56) References Cited

U.S. PATENT DOCUMENTS

| | | | | |
|---|---|---|---|---|
| 1,173,801 A | * | 2/1916 | Hess | ........... F01N 13/1855 239/289 |
| D112,482 S | * | 12/1938 | Koch | ........................... D12/194 |
| D117,279 S | * | 10/1939 | Koch | ........................... D12/194 |
| D118,048 S | * | 12/1939 | Koch | ........................... D12/194 |
| D119,268 S | * | 3/1940 | Koch | ........................... D12/194 |
| D124,393 S | * | 12/1940 | Russell | ....................... D12/194 |
| 2,260,841 A | * | 10/1941 | Russell | ................... F01N 13/20 239/500 |
| D133,788 S | * | 9/1942 | Koch | .................. F01N 13/1855 D12/194 |
| 2,355,674 A | * | 8/1944 | Peters | ........................ 239/288.5 |
| D156,421 S | * | 12/1949 | Kaplan | ........................ D12/194 |
| D158,848 S | * | 6/1950 | Follen | .................... F01N 13/20 D12/194 |
| D165,874 S | * | 2/1952 | Russell | ........................ D12/194 |
| D176,359 S | * | 12/1955 | Knight | ........................ D12/194 |
| D351,579 S | * | 10/1994 | Simpson | ..................... D12/194 |
| D458,570 S | * | 6/2002 | Wang | .......................... D12/194 |
| D642,006 S | * | 7/2011 | Seymour | ....................... D7/325 |
| 8,863,651 B1 | * | 10/2014 | Palmieri | ................. A23L 7/187 99/323.9 |
| 2007/0039318 A1 | * | 2/2007 | Krajewski | .............. F01N 13/20 60/317 |

* cited by examiner

*Primary Examiner* — Audrey K Bradley (74) *Attorney, Agent, or Firm* — Fleit Intellectual Property Law; Jon Gibbons (57) ABSTRACT

Disclosed is a removable aftermarket exhaust adapter for a walk behind blower. The adapter includes a housing with a top-side, a left-side, a right-side, a front-side, a rear-side, and a bottom-side, the rear-side defining a rear-side opening and the bottom-side defining a bottom-side opening. The bottom-side is parallel to the top-side. The right-side is parallel to the left-side. The front-side is rounded to form a truncated j-shape from the top-side to the bottom-side. The left-side and right-side define a triangular shape void where the rear-side meets the bottom-side. And the rear-side opening is in fluid communications with the bottom-side opening. In one example, the top-side includes at a plurality of holes for accepting fasteners therethrough. The housing is fabricated from a composite material, plastic, metal, or a combination thereof.

20 Claims, 10 Drawing Sheets

AFTER MARKET EXHAUST ADAPTER FOR DRYING COURTS

BACKGROUND

The present invention generally relates to a leaf blower, and more specifically to an aftermarket adapter to direct hot exhaust gas from a leaf blower.

Maintenance of courts, especially for tennis courts, requires periodic removal of debris such as leaves and grass. Leaf blowers are typically powered by gasoline motors. The larger units are mounted on wheels and are sometimes call "walk behind leaf blowers."

Outdoor courts for tennis and other sports are made of various materials. A hardcourt is a surface or on which tennis is played. A hardcourt is typically made of rigid materials such as asphalt or concrete, and covered with acrylic material to seal the surface and mark the playing lines, while providing some cushioning.

Outdoor hard courts, in addition, to having debris removed, must also be dried prior to use. Squeegees, rollers and other mechanisms are used to manually direct water off the surface of the court.

SUMMARY

Disclosed is a novel removable aftermarket exhaust adapter for a walk behind blower. The adapter includes a housing with a top-side, a left-side, a right-side, a front-side, a rear-side, and a bottom-side, the rear-side defining a rear-side opening and the bottom-side defining a bottom-side opening. The bottom-side is parallel to the top-side. The right-side is parallel to the left-side. The front-side is rounded to form a truncated j-shape from the top-side to the bottom-side. The left-side and right-side define a triangular shape void where the rear-side meets the bottom-side. And the rear-side opening is in fluid communications with the bottom-side opening. In one example, the top-side includes at a plurality of holes for accepting fasteners therethrough. The housing is fabricated from a composite material, plastic, metal, or a combination thereof.

In one example the removable aftermarket exhaust adapter for a walk behind blower, includes each of a housing with a top-side, a left-side, a right-side, a front-side, a rear-side, and a bottom-side, the rear-side defining a rear-side opening and the bottom-side defining a bottom-side opening. The geometry for the sides are the bottom-side is parallel to the top-side, the right-side is parallel to the left-side, the front-side is rounded to form a truncated j-shape from the top-side to the bottom-side and the left-side and right-side define a triangular shape void where the rear-side meets the bottom-side. The rear-side opening is in fluid communications with the bottom-side opening.

The top side may include a plurality of holes for accepting fasteners therethrough.

The housing may be fabricated from one of composite material, plastic, metal, or a combination thereof. At least a portion of the top-side, the left-side, the right-side, and the front-side are formed from a single piece of material, such as a stamped metal. In one example at least of a portion of the front-side which is a stamped metal that is fasten the single piece of material by soldering, brazing, welding or a combination thereof.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Overview

Courts, especially hard courts such as tennis courts, require maintenance such as removing debris and drying prior to use. The use of squeegees and rollers to remove water is in addition to clearing debris. The present invention provides a novel aftermarket exhaust adapter to dry a hard court surface by directing hot exhaust gases from a walk behind leaf blower onto the surface of the court while debris is being removed. The present invention assists with drying the court surface.

The present invention has been tested in Miami Fla. after rain storms and works very well at eliminating the need for separate debris removal and drying. Using the present invention debris removal and drying can be performed in a single pass saving time and reducing the cost of maintenance.

Example 1 of After Market Exhaust Adapter

Figure 1:
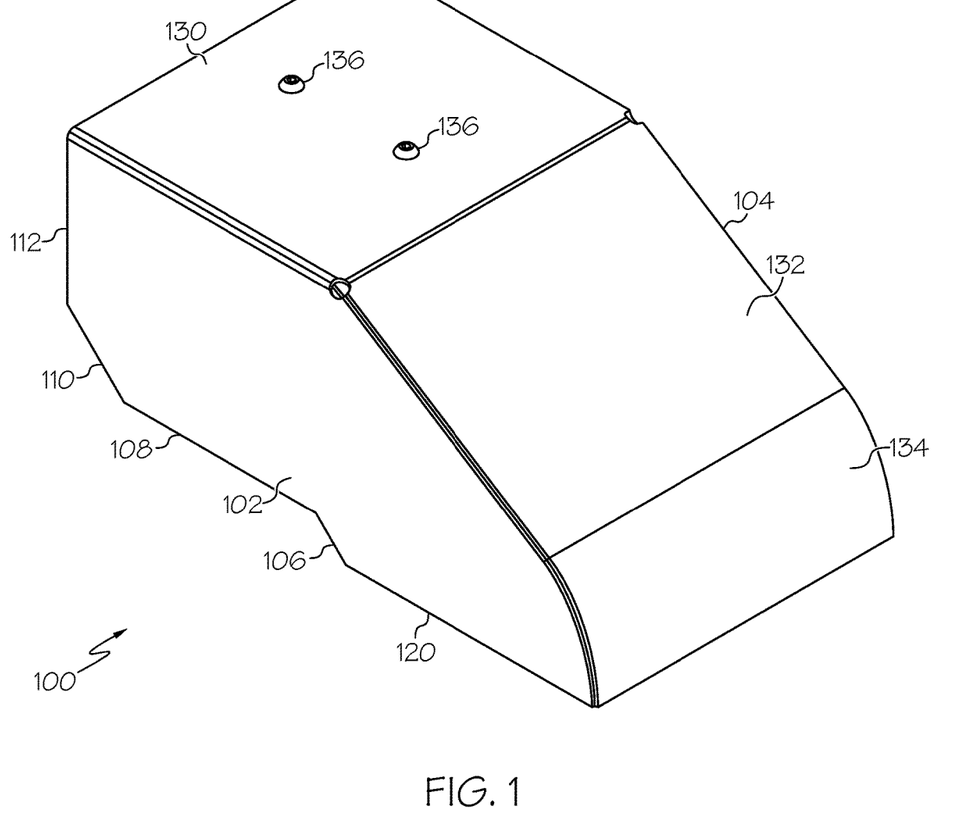
FIG. 1 is a front, left, top perspective view of the aftermarket exhaust adapter.
Figure 3:
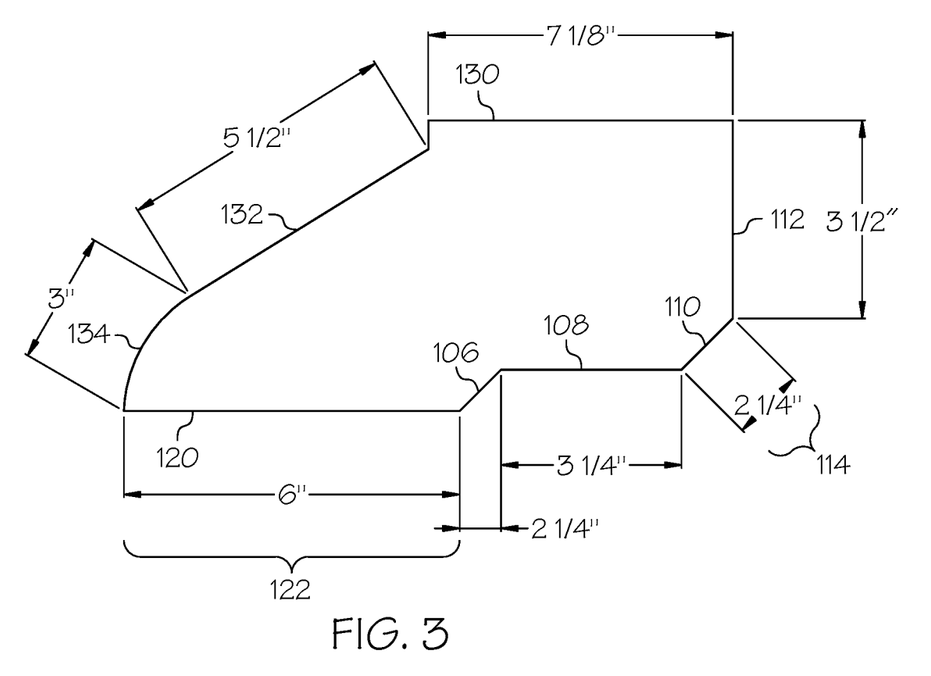
FIG. 3 is a side plan view of the aftermarket adapter of FIG. 1.

As shown in FIG. 1, is a front, left, top perspective view of a removable aftermarket exhaust adapter 100. The exhaust adapter 100 is a housing with a top-side 130, a left-side 102, a right-side 104, a front-side 132, a rear-side 110, and a bottom-side 120, the rear-side defining a rear-side opening 112 and the bottom-side defining a bottom-side opening 122, as shown in FIG. 3. As shown in FIG. 1, the bottom-side 120 is parallel to the top-side 130 and the right-side 104 is parallel to the left-side 102.

The front-side 132 of the exhaust adapter 100 is rounded 134 to form a truncated j-shape from the top-side to the bottom-side as shown.

The left-side 102 and right-side 104 define a triangular shape void 114 where the rear-side 110 meets the bottom-side 120 as shown. The triangular shaped void 114 is visible in FIG. 3. The rear-side opening of the exhaust adapter 100 is in fluid communications with the bottom-side opening. This enables the hot exhaust gas along with the heat of the exhaust to be directed out the bottom-side opening.

One or more holes as formed in the top-side 130 of the exhaust adapter 100 for allowing fasteners to pass therethrough as will be further described with reference to FIG. 7 below.

The exhaust adapter 100 can be made from metal, plastic, composite, or a combination thereof.

Figure 2:
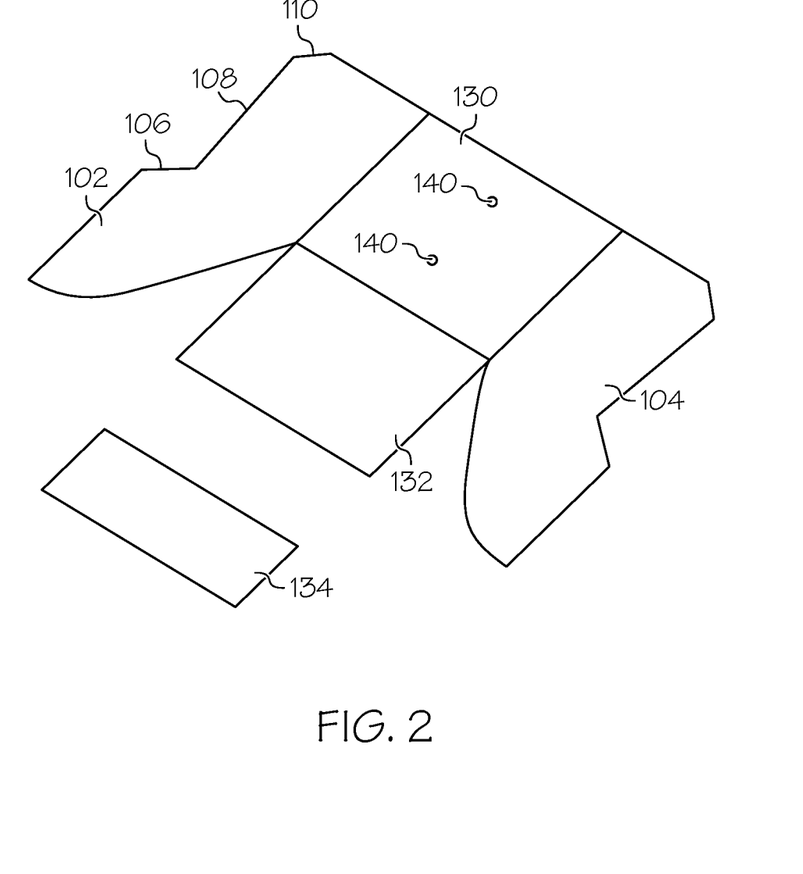
FIG. 2 is top, right view of cutouts used to fabricate the aftermarket exhaust adapter of FIG. 1.

Turning to FIG. 2, shown is a top, right view of cutouts used to fabricate the aftermarket exhaust adapter 100 of FIG. 1. The cutouts can be made from a single piece of material, such as metal, plastic, composite, or a combination thereof. The material is bent to provide the shape of FIG. 1 using known techniques including jigs, brakes, and other metal working machines. The rounded 134 front side may be formed by a separate rectangular piece as shown in FIG. 2. One or more score lines running length wise (not shown) are used to assist with forming the rounding shapes. The round 134 piece may be joined to the rest of the front-side 132 by soldering, brazing, welding or a combination thereof.

FIG. 3 is a side plan view of the aftermarket adapter 100 of FIG. 1. The approximate dimensions are shown as follows:

bottom side 120 is 6 inches in length;
top-side 130 is 7⅛ inches in length;
rear-side 112 is 3½ inches in length;
first rear chamfer 110 is 2¼ inches in length;
bottom portion 108 is 3¹⁄₁₁ inches in length;
second rear chamfer 106 is 2¼ inches in length;
front-side 132 is approximately 5½ inches in length; and
front-side 134 is approximately 3 inches in length.

Example 2 of After Market Exhaust Adapter

Figure 4:
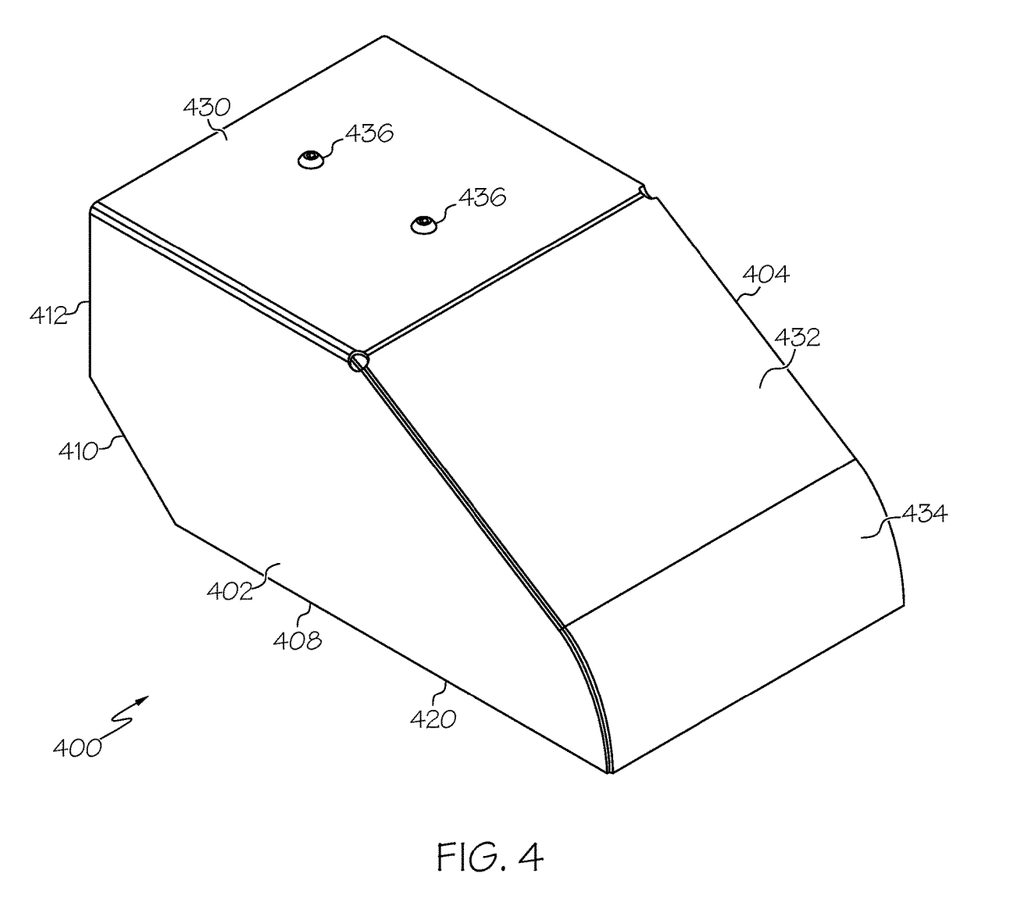
FIG. 4 is a front, right, top perspective view of the aftermarket exhaust adapter with a different rear side configuration.
Figure 6:
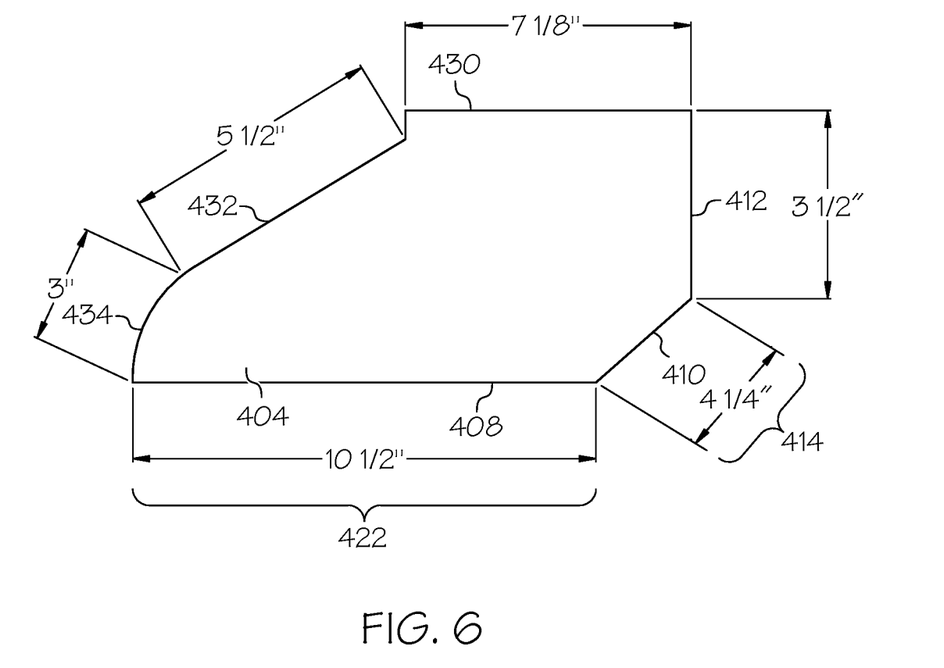
FIG. 6 is a side plan view of the aftermarket adapter of FIG. 4.

As shown in FIG. 4, is a front, right, top perspective view of a removable aftermarket exhaust adapter 400 with a different rear side configuration. The exhaust adapter 400 is a housing with a top-side 430, a left-side 402, a right-side 404, a front-side 432, a rear-side 410, and a bottom-side 420 with bottom portion 408, the rear-side defining a rear-side opening 412 and the bottom-side defining a bottom-side opening 422, as shown in FIG. 6. As shown in FIG. 4, the bottom-side 420 is parallel to the top-side 430 and the right-side 404 is parallel to the left-side 402.

The front-side 432 of the exhaust adapter 400 is rounded 434 to form a truncated j-shape from the top-side to the bottom-side as shown.

The left-side 402 and right-side 404 define a triangular shape void 414 where the rear-side 410 meets the bottom-side 420 as shown. The triangular shaped void 414 is visible in FIG. 6. The rear-side opening of the exhaust adapter 400 is in fluid communications with the bottom-side opening. This enables the hot exhaust gas along with the heat of the exhaust to be directed out the bottom-side opening.

One or more holes as formed in the top-side 430 of the exhaust adapter 400 for allowing fasteners to pass therethrough as will be further described with reference to FIG. 7 below.

The exhaust adapter 400 can be made from metal, plastic, composite, or a combination thereof.

Figure 5:
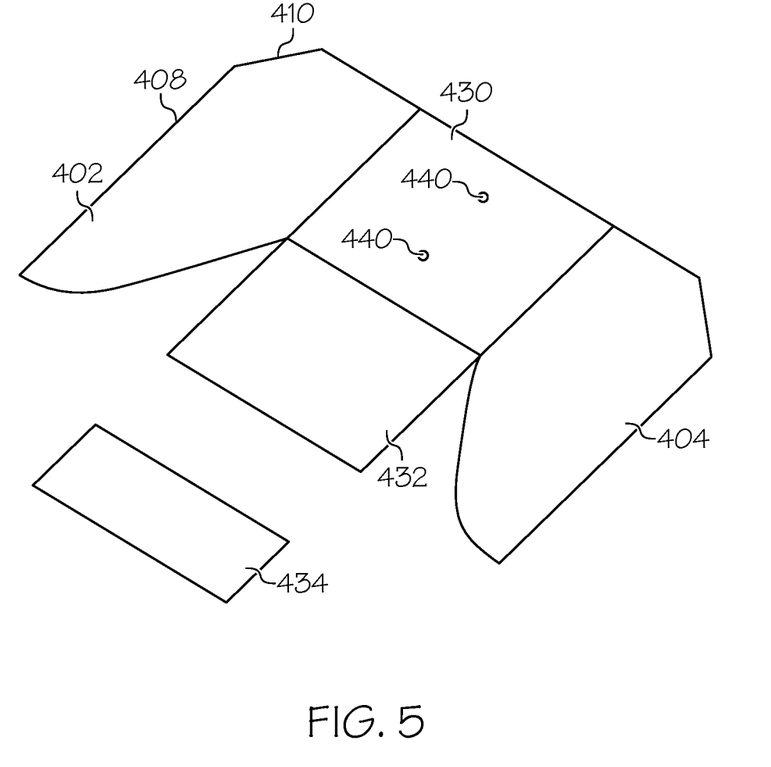
FIG. 5 is top, right view of cutouts used to fabricate the aftermarket exhaust adapter of FIG. 4.

Turning to FIG. 5, shown is a top, right view of cutouts used to fabricate the aftermarket exhaust adapter 400 of FIG. 4. The cutouts can be made from a single piece of material, such as metal, plastic, composite, or a combination thereof. The material is bent to provide the shape of FIG. 4 using known techniques including jigs, brakes, and other metal working machines. The rounded 434 front side may be formed by a separate rectangular piece as shown in FIG. 5. One or more score lines running length wise (not shown) are used to assist with forming the rounding shapes. The round 434 piece may be joined to the rest of the front-side 432 by soldering, brazing, welding or a combination thereof.

FIG. 6 is a side plan view of the aftermarket adapter 400 of FIG. 4. The approximate dimensions are shown as follows:

bottom side 404 is 5⅞ inches in length;
top-side 430 is 7⅛ inches in length;
rear-side 412 is 3½ inches in length;
rear chamfer is 3 inches in length;
front-side 432 is approximately 5½ inches in length; and
front-side 434 is approximately 3 inches in length.

Mounted After Market Removable Exhaust

Figure 7:
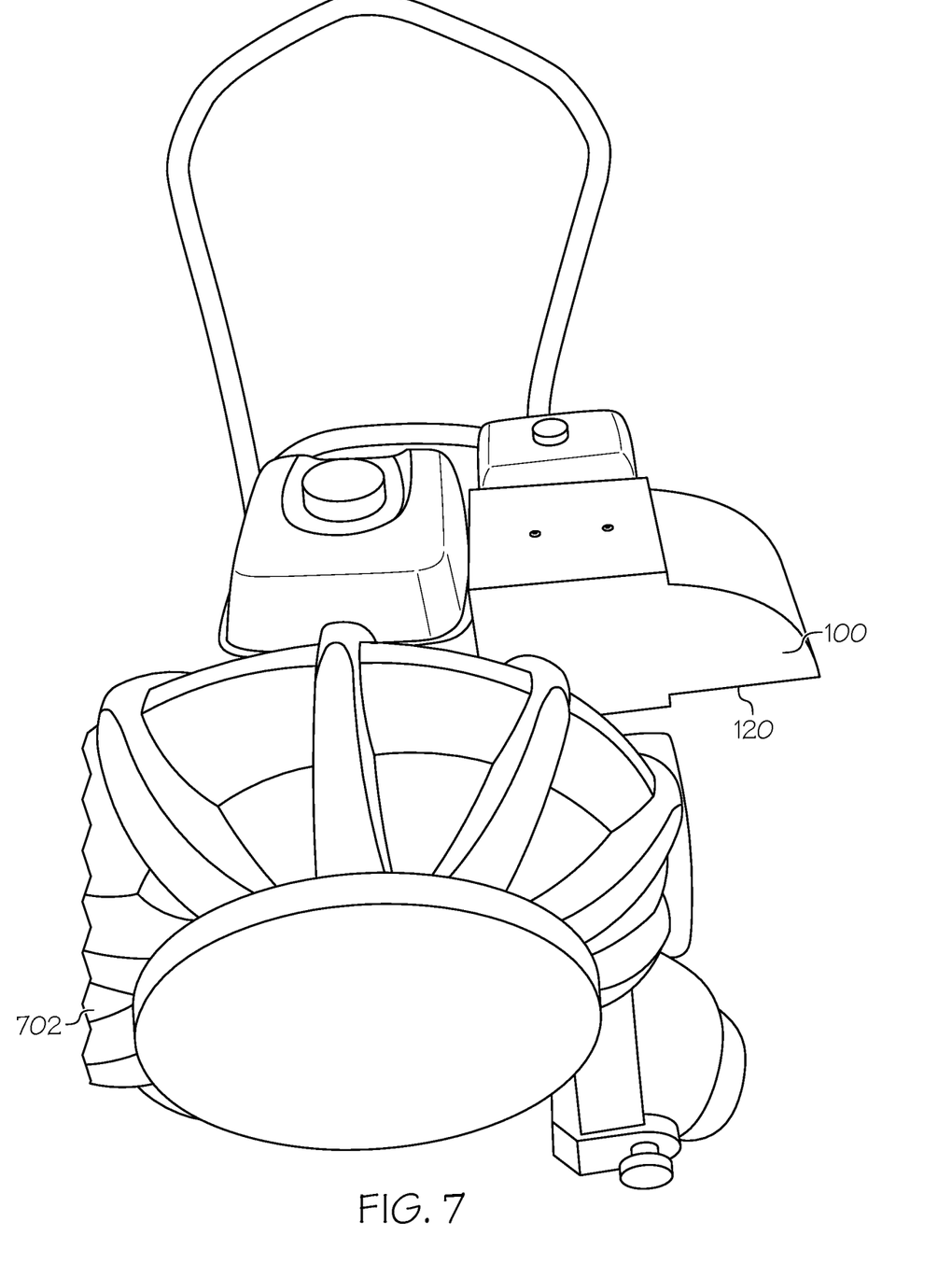
FIG. 7 is a front, top perspective view of the aftermarket exhaust adapter of FIG. 1 mounted on an exhaust of a blower.
Figure 8:
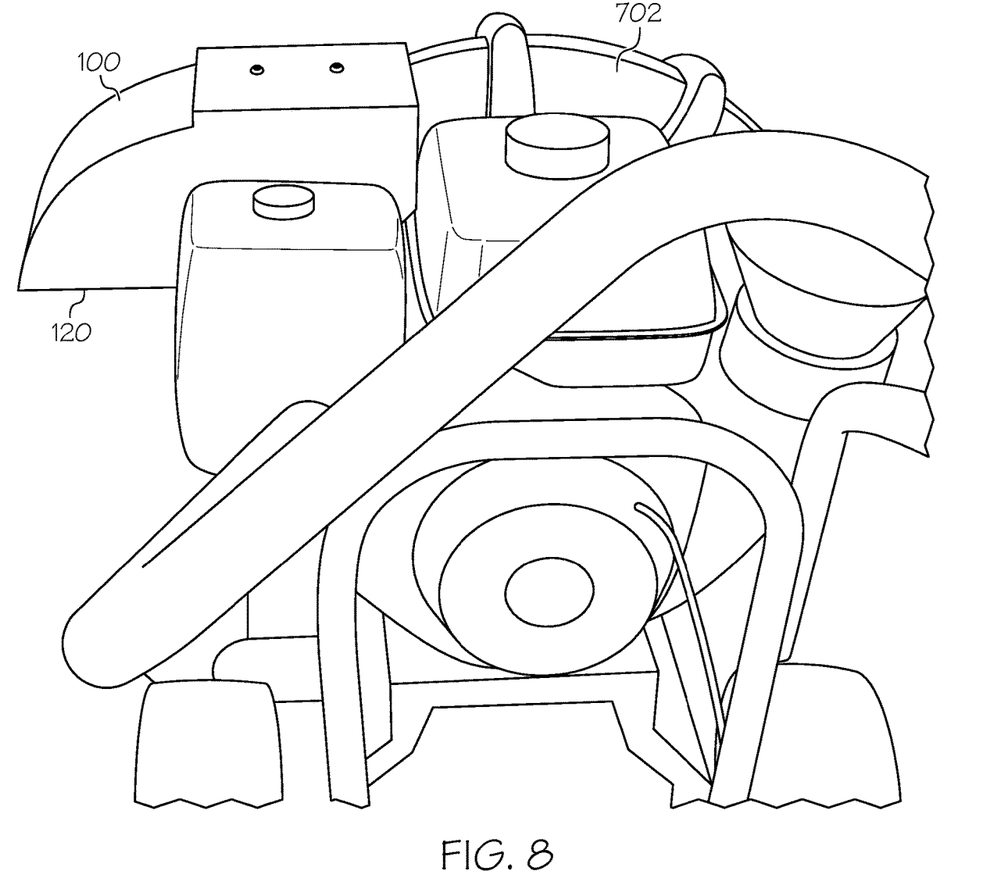
FIG. 8 is a rear, top perspective view of the aftermarket exhaust adapter of FIG. 1 mounted on an exhaust of a blower.
Figure 9:
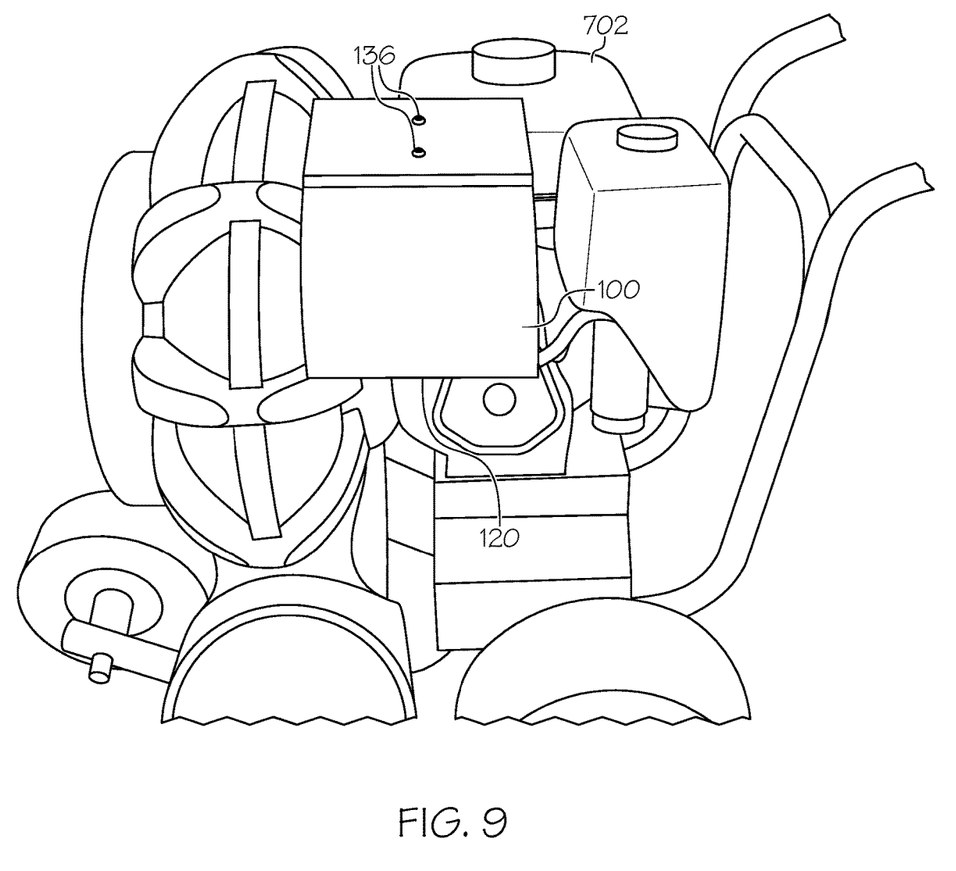
FIG. 9 is a top perspective view of the aftermarket exhaust adapter of FIG. 1 mounted on an exhaust of a blower.
Figure 10:
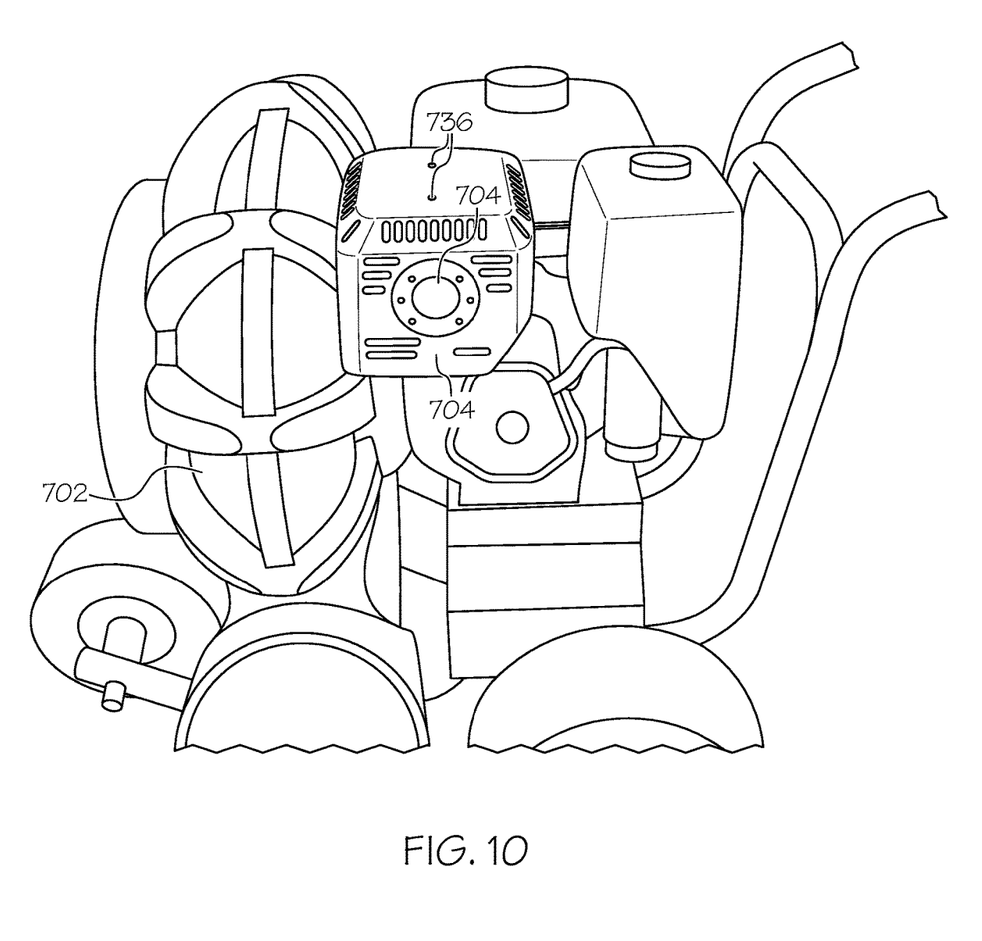
FIG. 10 is a left perspective view of mounted on an exhaust of a blower of FIG. 7 through FIG. 9 but with the aftermarket exhaust adapter removed.

FIG. 7 is a front, top perspective view of the aftermarket exhaust adapter 100 of FIG. 1 mounted on an exhaust 704 of a blower 702 as shown in FIG. 10. The bottom-side opening 120 is facing toward the earth. FIG. 8 is a rear, top perspective view of the aftermarket exhaust adapter 100 of FIG. 1 mounted on an exhaust 704 of a blower 702. FIG. 9 is a top perspective view of the aftermarket exhaust adapter 100 of FIG. 1 mounted on an exhaust 704 of a blower 702. The two fasteners 136 top-side 130 are shown to secure the aftermarket exhaust adapter 100 to the blower 702. Fasteners 436 of FIG. 4 serve the same function as fasteners 136 of FIG. 1.

FIG. 10 is a left perspective view of mounted on an exhaust 704 of a blower 702 of FIG. 7 through FIG. 9 but with the aftermarket exhaust adapter 100 removed. The exhaust 704 of the blower 702 is shown. An exhaust 704 is shown. The aftermarket exhaust adapter 100 is designed to envelope the exhaust and use mounting screws or mounting fasteners 736 to hold it firmly in place through openings 140 (openings 440 in FIG. 5) of a surface 138 of the top-side 136. The aftermarket exhaust adapter 100 not only redirects the exhaust downward, it also redirects the heat by surrounding the exhaust 704 downward as well.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A removable aftermarket exhaust adapter for a walk behind blower, comprising:
   a housing with a top-side, a left-side, a right-side, a front-side, a rear-side, and a bottom-side, the rear-side defining a rear-side opening and the bottom-side defining a bottom-side opening,
   wherein the bottom-side is parallel to the top-side,
   wherein the right-side is parallel to the left-side,
   wherein the front-side is rounded to form a truncated j-shape from the top-side to the bottom-side;
   wherein the left-side and right-side define a triangular shape void where the rear-side meets the bottom-side, and
   wherein the rear-side opening is in fluid communications with the bottom-side opening.

2. The removable aftermarket exhaust adapter of claim 1, wherein the top-side includes a plurality of holes for accepting fasteners therethrough.

3. The removable aftermarket exhaust adapter of claim 1, wherein the housing is fabricated from metal.

4. The removable aftermarket exhaust adapter of claim 1, wherein the housing is fabricated from a composite material.

5. The removable aftermarket exhaust adapter of claim 1, wherein the housing is fabricated from a composite material, plastic, metal, or a combination thereof.

6. The removable aftermarket exhaust adapter of claim 1, wherein at least a portion of the top-side, the left-side, the right-side, and the front-side are formed from a single piece of material.

7. The removable aftermarket exhaust adapter of claim 6, wherein the single piece of material is a stamped metal.

8. The removable aftermarket exhaust adapter of claim 6, wherein at least the portion of the front-side which is a stamped metal is fastened to at least one of the top-side, the left-side, the right-side by soldering, brazing, welding or a combination thereof.

9. The removable aftermarket exhaust adapter of claim 1, wherein the bottom-side is 6 inches in length from the front-side to the rear-side.

10. The removable aftermarket exhaust adapter of claim 9, wherein the top-side is 7⅛ inches in length from the front-side to the rear-side.

11. The removable aftermarket exhaust adapter of claim 10, wherein the rear-side is 3½ inches in length from the top-side to the bottom-side.

12. The removable aftermarket exhaust adapter of claim 10, wherein the front-side is 8½ inches in height from the top-side to the bottom-side.

13. A removable aftermarket exhaust adapter for a walk behind blower, comprising:
    a walk-behind blower with a combustion engine having an exhaust that produces hot exhaust gas; and
    a housing with a top-side, a left-side, a right-side, a front-side, a rear-side, and a bottom-side, the rear-side defining a rear-side opening and the bottom-side defining a bottom-side opening,
    wherein the bottom-side is parallel to the top-side,
    wherein the right-side is parallel to the left-side,
    wherein the front-side is rounded to form a truncated j-shape from the top-side to the bottom-side;
    wherein the left-side and right-side define a triangular shape void where the rear-side meets the bottom-side, and
    wherein the rear-side opening is in fluid communications with the bottom-side opening, the rear-side opening adapted to fit over the exhaust for directing the hot exhaust gas therefrom out through the bottom-side opening.

14. The removable aftermarket exhaust adapter of claim 13, wherein the top-side includes a plurality of holes for accepting fasteners therethrough and the fasteners adapted to engage with the exhaust of the walk-behind blower.

15. The removable aftermarket exhaust adapter of claim 13, wherein the housing is fabricated from metal.

16. The removable aftermarket exhaust adapter of claim 13, wherein the housing is fabricated from a composite material.

17. The removable aftermarket exhaust adapter of claim 13, wherein the housing is fabricated from a composite material, plastic, metal, or a combination thereof.

18. The removable aftermarket exhaust adapter of claim 13, wherein at least a portion of the top-side, the left-side, the right-side, and the front-side are formed from a single piece of material.

19. The removable aftermarket exhaust adapter of claim 18, wherein the single piece of material is a stamped metal.

20. The removable aftermarket exhaust adapter of claim 18, wherein at least the portion of the front-side which is a stamped metal is fastened to at least one of the top-side, the left-side, the right-side by soldering, brazing, welding or a combination thereof.

* * * * *